Patented Apr. 6, 1943

2,316,082

UNITED STATES PATENT OFFICE 2,316,082

LUBRICANT

Clarence M. Loane, Hammond, Ind., and James W. Gaynor, Chicago, Ill., assignors to Standard Oil Company, Chicago, Ill., a corporation of Indiana No Drawing. Application March 24, 1941, Serial No. 384,941

31 Claims. (Cl. 252—48)

The present invention relates to a method of substantially inhibiting the formation and/or deposition of gums, resins, and varnish-like materials in internal combustion engines and upon and about the valves and rings of such engines.

Many oils are not well suited for the lubrication of internal combustion engines, particularly engines of the Diesel type and of other types operating under similar severe operating conditions, because they are susceptible to deterioration under such severe operating conditions, which results in the development of carbonaceous and/or resinous or similar varnish-like deposits in the engine and on and about the valves and rings thereof. These objectionable deposits often result in such sticking of the valves and rings as to interfere seriously with the operation of the engine.

It is an object of the present invention to provide an additive for lubricating oils which will materially inhibit the formation of carbon and/or resinous varnish-like materials in internal combustion engines and on and about the valves, pistons and rings of the engine.

It is a further object of the present invention to provide a method of lubricating internal combustion engines operating under severe conditions without the formation of substantial amounts of carbonaceous and varnish-like materials on the valves, pistons and piston rings of the engine. Other objects and advantages of the invention will become apparent as the description thereof proceeds.

We have discovered that the foregoing objects may be attained by lubricating internal combustion engines with a lubricating oil, preferably a mineral lubricating oil, containing small amounts, namely from about 0.001% to about 10.0%, preferably from about 0.01% to about 3.0% of a neutralized reaction product of a hydrocarbon and a sulfide of phosphorus. The sulfide of phosphorus may be $P_2S_3$, $P_2S_5$, $P_4S_3$, $P_4S_7$, or other phosphorus sulfide, and preferably phosphorus pentasulfide, $P_2S_5$.

The phosphorus sulfide-hydrocarbon reaction product normally shows a titratable acidity. This titratable acidity is neutralized when the reaction product is treated with a basic reagent. The phosphorus sulfide-hydrocarbon reaction product when neutralized with a basic reagent containing a metal constituent is characterized by the presence or retention of the metal constituent of the reagent. Other metal constituents such as a heavy metal constituent may be introduced into the neutralized product by reacting the same with a salt of the desired heavy metal.

The term "neutralized phosphorus sulfide-hydrocarbon reaction product" as used herein means a phosphorus sulfide-hydrocarbon reaction product having at least about 1% of its titratable acidity reduced by the reaction with a basic reagent, and includes the neutralized phosphorus sulfide-hydrocarbon reaction products containing a metal constituent resulting from said neutralization or resulting from the reaction of a heavy metal salt with the phosphorus sulfide-hydrocarbon reaction product treated with a basic reagent.

The neutralized phosphorus sulfide-hydrocarbon reaction product may be obtained by adding to the reaction product a suitable basic compound such as a hydroxide, carbonate, or an oxide of an alkaline earth metal or of an alkali metal, preferably potassium hydroxide or sodium hydroxide. Other basic reagents may be used such as, for example, ammonia, or alkyl or aryl substituted ammonia, such as amines. As aforesaid, when the phosphorus sulfide-hydrocarbon reaction product is neutralized with a basic compound containing a metal constituent the neutralized reaction product is characterized by the presence of the metal constituent of such basic reagent. Neutralized reaction products containing a heavy metal constituent such as, for example, tin, titanium, aluminum, chromium, cobalt, iron and the like may be obtained by reacting a salt of the desired heavy metal with the phosphorus sulfide-hydrocarbon reaction product which has been treated with a basic reagent.

It will be understood that when the neutralization is accomplished with a polyvalent basic material, such as lime, a product having excess basicity may be obtained.

The hydrocarbon reactant is preferably a hydrocarbon compound having a molecular weight greater than about 150 and preferably a molecular weight greater than about 300. The hydrocarbons may be paraffins, olefins or olefin polymers, aromatics, or alkyl aromatics, cyclic aliphatics, petroleum fractions such as lubricating oil fractions, petrolatums, waxes, cracked cycle stocks, or condensation products of petroleum fractions, solvent extracts of petroleum fractions, etc.

Essentially paraffinic hydrocarbons such as bright stock residuums, lubricating oil distillates, petrolatums, or paraffin waxes may be used. We may also employ the condensation products of any of the foregoing hydrocarbons, usually through first halogenating the hydrocarbons, with aromatic hydrocarbons in the presence of anhydrous inorganic halides, such as aluminum chloride, zinc chloride, boron fluoride and the like.

As examples of high molecular weight olefinic hydrocarbons which we may employ as reactants are cetene ($C_{16}$), cerotene ($C_{26}$), melene ($C_{30}$), and mixed high molecular weight alkenes obtained by cracking petroleum oils.

We may also employ olefin polymers having molecular weights above 150 and preferably above 300. As olefinic starting materials for the production of such polymers, we may employ the individual olefins themselves, mixtures of olefins, or mixtures of olefins and non-olefinic compounds. For example, the olefinic starting material may be butylene, amylenes, refinery gases containing normally gaseous olefins and cracked distillates or other relatively low-boiling hydrocarbon mixtures containing normally liquid olefins and mixtures of normally liquid olefins containing substantial amounts of dissolved normally gaseous olefins. We may also employ olefins obtained by the cracking of paraffin wax or by the dehalogenation of alkyl halides, particularly long chain alkyl halides.

The polymers referred to above may be those obtained by polymerizing olefinic hydrocarbons in the presence of catalysts such as sulfuric acid, phosphoric acid, or aluminum chloride, zinc chloride, boron fluoride and other catalysts of the Friedel-Crafts type. For example, we may employ the polymers resulting from the treatment of mono-olefins preferably iso-mono-olefins such as isobutylene and isoamylene and/or the copolymers obtained by the polymerization of hydrocarbon mixtures containing low molecular weight iso-olefins and normal olefins, preferably those of less than six carbon atoms.

We may also employ as the starting material the polymer or synthetic lubricating oil obtained by polymerizing unsaturated hydrocarbons resulting from the vapor phase cracking of paraffin waxes in the presence of aluminum chloride which is fully described in United States Patents Nos. 1,995,260, 1,970,002 and 2,091,398. Still another type of olefin polymer which may be employed is the polymer resulting from the treatment of vapor phase cracked gasoline and/or gasoline fractions with sulfuric acid or solid absorbents such as fuller's earth whereby unsaturated polymerized hydrocarbons are removed. Also contemplated within the scope of our invention is the treatment with phosphorus sulfide of the polymers resulting from the voltolization of hydrocarbons as described, for example, in United States Patents Nos. 2,197,768 and 2,191,787.

Also contemplated within the scope of the present invention are the reaction products of a phosphorus sulfide with an aromatic hydrocarbon such as, for example, benzene, naphthalene, toluene, xylene, diphenyl and the like, or with an alkylated aromatic hydrocarbon such as, for example, benzene having an alkyl substituent having at least four carbon atoms and preferably at least eight carbon atoms such as a long chain paraffin wax.

The additive employed in the present invention is the neutralized reaction product obtained by reacting one or more of the hereindescribed hydrocarbons with a phosphorus sulfide, preferably phosphorus pentasulfide. The phosphorus sulfide-hydrocarbon reaction product may be readily obtained by reacting the phosphorus sulfide, for example, $P_2S_5$, with the hydrocarbon at a temperature of from about 200° F. to about 500° F. and preferably from about 200° F. to about 400° F. using from about 1% to about 50% and preferably from about 5% to about 25% of the phosphorus sulfide in the reaction. It is advantageous to maintain a nonoxidizing atmosphere, such as, for example, an atmosphere of nitrogen, above the reaction mixture. Usually it is preferable to use an amount of the phosphorus sulfide that will completely react with the hydrocarbon so that no further purification becomes necessary. However, excess phosphorus sulfide may be used and separated from the product after heating is discontinued by filtering or by diluting with a solvent such as hexane, filtering, and subsequently distilling off the solvent. If desired, the reaction product may be further treated by blowing with steam at an elevated temperature of from about 200° F. to about 600° F. to improve the odor thereof.

The neutralized phosphorus sulfide-hydrocarbon reaction product may then be prepared by reacting the above phosphorus sulfide-hydrocarbon reaction product with a hydroxide, an oxide or a carbonate of an alkali metal or an alkaline earth metal, and preferably with potassium hydroxide or sodium hydroxide. This reaction may be carried out, preferably in a nonoxidizing atmosphere, by contacting the phosphorus sulfide-hydrocarbon reaction product either as such or dissolved in a suitable solvent such as naphtha with a solution of the metal compound, for example, potassium hydroxide or sodium hydroxide dissolved in alcohol. As an alternative method the phosphorus sulfide-hydrocarbon reaction product may be treated with solid alkaline compounds, such as, KOH, NaOH, $Na_2CO_3$, $NaHCO_3$, $KHCO_3$, $K_2CO_3$, CaO, preferably at an elevated temperature of from about 100° F. to 400° F. Neutralized reaction products containing a heavy metal constituent may be prepared by reacting the neutralized reaction product with a salt of the desired heavy metal.

The phosphorus sulfide-hydrocarbon reaction product or the neutralized reaction product may be treated with halogen to introduce a halogen constituent.

The neutralized phosphorus sulfide-hydrocarbon reaction product may be used in lubricating oils alone, or in combination with the non-neutralized phosphorus sulfide-hydrocarbon reaction product. A much improved lubricant is obtained when a small amount, for example, from about 0.001% to about 10.0% and preferably from about 0.01% to about 3.0% of the neutralized phosphorus sulfide-hydrocarbon reaction product is added to a lubricating oil alone or in combination with about 0.001% to about 10.0% and preferably from about 0.01% to about 3.0% of the non-neutralized phosphorus sulfide-hydrocarbon reaction product.

As a specific embodiment of our invention the following examples are given by way of illustration and are not intended as a limitation of the invention.

EXAMPLE I

A polymer obtained by treating a hydrocarbon mixture containing about 10% to about 25% isobutylene with boron fluoride at a temperature of about 32° F. was distilled to a bottoms having a Saybolt Universal viscosity at 210° F. of about 3000 seconds. These bottoms were then reacted with about 10% phosphorus pentasulfide at a temperature of 370° F. to 390° F. for about five hours, and then blown with nitrogen for an additional five hours within the same temperature range. This reaction product had a sulfur content of about 6% and a phosphorus content of about 3%. A portion of this reaction product was then diluted with about 5 volumes of hexane and thoroughly agitated with about 3 volumes of 5% of KOH in 70% alcohol. The product after the hexane layer was separated and the hexane removed by distillation, was a neutralized $P_2S_5$-isobutylene polymer reaction product containing potassium as a metal constituent.

EXAMPLE II

A portion of the above non-neutralized $P_2S_5$-polymer reaction product of Example I was treated in the following manner: To 300 grams of the reaction product, 9 grams of dry KOH were added at a temperature of about 200° F. The temperature was then increased to 340° F., maintained at about 340° F.–350° F. for five hours, and then heated at this temperature for eighteen more hours while bubbling nitrogen through the mixture. The final product containing potassium was neutralized to a lesser degree than the product of Example I and had an acidity of 10.5 mg. KOH per gram of product.

The neutralized products may be further improved as to odor by blowing the same at an elevated temperature with steam or nitrogen.

Samples of an SAE 20 lubricating oil containing (1) ½% of the $P_2S_5$-isobutylene polymer reaction product of Example I and ½% of the above neutralized $P_2S_5$-isobutylene polymer reaction product of Example I (2) 1% of the above neutralized product of Example II and (3) 1% of the above neutralized product of Example I, were subjected to the hereinafter described tests along with known commercial oils to determine the relative effectiveness of our improved lubricant.

In the first test the oils were subjected to an accelerated engine test made in a standard six cylinder automobile motor operating for sixty hours at 35 B. H. P. and 3000 R. P. M. and an oil sump temperature of about 285° F. At the end of the test period the engine was dismantled and given a visual engine rating. In this visual rating a rating of 10 means that the engine had the appearance of the engine at the start of the test, while a rating of 1 means that the engine after the test showed very extensive depositions of varnish and sludge. Engines having appearances between these extremes are given intermediate rating values. An engine lubricated with a good conventional motor oil for a sixty hour period usually merits a visual rating of about 5.

In Table I data on the following oils are tabulated:

Oil A is a high grade SAE 20 motor oil from MC crude oil.
Oil B is a high grade heavy duty bus and truck motor oil.
Oil C is a high grade SAE 20 Pennsylvania motor oil.
Oil D is oil A+½% of the non-neutralized $P_2S_5$-isobutylene polymer reaction product of Example I+½% of the neutralized $P_2S_5$-isobutylene polymer reaction product of Example I.
Oil E is oil A+1% of the neutralized $P_2S_5$-isobutylene polymer reaction product of Example II.
Oil F is oil A+1% of the neutralized $P_2S_5$-isobutylene polymer reaction product of Example I.

TABLE I
ACCELERATED ENGINE TEST
*Visual engine rating at end of 60 hours*

| Oil | Piston varnish | Sludge deposits | Ring belt carbon | Under crown carbon | Overall rating |
|---|---|---|---|---|---|
| Oil A | 4.9 | 4.4 | 5.4 | 5.1 | 5.0 |
| Oil B | 5 | 7 | 6 | 6 | 6.0 |
| Oil C | 8 | 7 | 8 | 8 | 7.8 |
| Oil D | 10 | 10 | 10 | 9+ | 9.8 |
| Oil E | 9.3 | 9.5 | 10 | 8 | 9.2 |
| Oil F | 9.7 | 9.5 | 9.7 | 9.5 | 9.6 |

The condition of the engine after the sixty hour test with oil D was substantially the same as regards cleanliness as that at the start of the test, and was far better than the condition of the engine at the completion of the tests using oil A, B, or C.

Our improved oil is also very stable against deterioration in use as demonstrated by the data in Table II in which are tabulated inspections of the oils at the termination of the sixty hour engine tests.

TABLE II
*Oil deterioration at end of 60 hour engine test*

| Oil | Viscosity[1] increase | Acidity mg. KOH/g. oil | Percent carbon residue | Sludge mg./10 g. oil |
|---|---|---|---|---|
| | Seconds | | | |
| Oil A | 30 | 9.7 | 2.5 | 315 |
| Oil B | 14 | 2.4 | 1.31 | 162 |
| Oil C | 76.5 | 15.1 | 3.89 | 8 |
| Oil D | 4 | 2.0 | 0.51 | 3 |

[1] Saybolt Universal viscosity at 210° F.

The above data show the marked stability of our improved lubricant.

In a second test 250 cc. of the oil to be tested is heated at 330°–332° F. in a 500 cc. glass beaker in the presence of five square inches of copper and ten square inches of iron. Four glass rods of six millimeter diameter are suspended in the oil which is stirred at about 1300 R. P. M. with a glass stirrer having a 40° blade pitch. At stated intervals oil samples are taken and sludge, acidity and viscosity values determined. The glass rods are also inspected for evidence of varnish formation thereon. Varnish values are based on a visual rating in which a glass rod free of any varnish is given a rating of 10, while a badly coated rod is given a rating of 1. Rods having appearances between these extremes are given intermediate values. Using the same oils employed in the engine tests, the following data were obtained in the above described test.

TABLE III
STIRRING OXIDATION TEST
(1300 R. P. M. 330° F., metallic iron and copper catalysts)

| Oil | Viscosity increase[2] 48 hrs. | Sludge mg./10 g. oil | | Acidity mg. KOH/g. oil | | Varnish[1] | |
|---|---|---|---|---|---|---|---|
| | | 24 hrs. | 48 hrs. | 24 hrs. | 48 hrs. | 24 hrs. | 48 hrs. |
| Oil A | 607 | 30 | 762 | 3.7 | 9.0 | 8 | 2–3 |
| Oil B | 600 | 40 | 220 | 5.5 | 9.7 | 6 | 1 |
| Oil C | 700 | 0 | 15 | 4.5 | 9.9 | 10 | 10 |
| Oil D | 109 | 0 | 0 | 1.1 | 2.7 | 10 | 10 |
| Oil E | 65 | 0 | 0 | 1.4 | 1.4 | 10 | 10 |
| Oil F | 112 | 0 | 32 | 1.9 | 2.0 | 10 | 10 |

[1] Rating scale: 10=no deposit. 1=very heavy deposit.
[2] Saybolt Universal viscosity at 100° F.

These data show the superiority of oils D, E, and F over the high grade well known commercial motor oils.

While we have described the use of our additives in lubricating oils, our invention is not limited to such use, since these reaction products may be employed in other petroleum products such as insulating oils, white oils, greases, waxes and the like to increase the resistance thereof to oxidation and sludging, to inhibit the tendency thereof to corrode metals, and to deactivate metal surfaces which the above products may contact.

The reaction product per se made according to this invention, and the method of preparing same are claimed in a copending application.

While we have described preferred embodiments of our invention, other modifications thereof may be made without departing from the scope and spirit of the invention, and we do not wish to limit our invention to the examples set forth herein except insofar as the same is defined by the following claims.

We claim:

1. A lubricant comprising a mineral lubricating oil and a minor amount of a neutralized phosphorus and sulfur-containing reaction product of a phosphorus sulfide and a hydrocarbon obtained by reacting a phosphorus sulfide with a hydrocarbon and subsequently neutralizing the reaction product with a basic reagent.

2. A lubricant comprising a mineral lubricating oil and a minor amount of a neutralized phosphorus and sulfur-containing reaction product of a phosphorus sulfide and a petroleum oil obtained by reacting a phosphorus sulfide with a petroleum oil and subsequently neutralizing the reaction product with a basic reagent.

3. A lubricant comprising a mineral lubricating oil and a minor amount of a potassium-containing neutralized phosphorus and sulfur containing reaction product of phosphorus pentasulfide and a hydrocarbon obtained by reacting a phosphorus sulfide with a hydrocarbon and subsequently neutralizing the reaction product with a basic reagent containing potassium as a metal constituent thereof.

4. A lubricant comprising a mineral lubricating oil and a minor amount of a potassium-containing neutralized phosphorus and sulfur containing reaction product of phosphorus pentasulfide and a petroleum oil obtained by reacting phosphorus pentasulfide with a petroleum oil and subsequently neutralizing the reaction product with a basic reagent containing potassium as a metal constituent thereof.

5. The method of inhibiting the formation of deposits of the type of sludge, carbon and varnish in an internal combustion engine during use comprising lubricating said engine with a lubricant comprising a lubricating oil and a small amount of a neutralized phosphorus and sulfur-containing reaction product of a phosphorus sulfide and a hydrocarbon obtained by reacting a phosphorus sulfide with a hydrocarbon and subsequently neutralizing the reaction product with a basic reagent.

6. The method of inhibiting the formation of deposits of the type of sludge, carbon and varnish in an internal combustion engine during use comprising lubricating said engine with a lubricant comprising a lubricating oil and a small amount of a neutralized phosphorus and sulfur-containing reaction product of a phosphorus sulfide and a petroleum oil obtained by reacting a phosphorus sulfide with a petroleum oil and subsequently neutralizing the reaction product with a basic reagent.

7. The method of inhibiting the formation of deposits of the type of sludge, carbon and varnish in an internal combustion engine during use comprising lubricating said engine with a lubricant comprising a lubricating oil normally susceptible to form sludge, carbon and varnish in an internal combustion engine during use and a small amount of a heavy metal-containing neutralized phosphorus and sulfur-containing reaction product of phosphorus pentasulfide and a hydrocarbon obtained by reacting phosphorus pentasulfide with a hydrocarbon and subsequently neutralizing the reaction product with a basic reagent containing a heavy metal constituent.

8. The method as described in claim 7 in which the hydrocarbon is a petroleum oil.

9. The method of inhibiting the formation of deposits of the type of sludge, carbon and varnish in an internal combustion engine during use comprising lubricating said engine with a lubricant comprising a lubricating oil normally susceptible to form sludge, carbon and varnish in an internal combustion engine during use and a small amount of an alkali metal-containing neutralized phosphorus and sulfur-containing reaction product of phosphorus pentasulfide and a hydrocarbon obtained by reacting phosphorus pentasulfide with a hydrocarbon and subsequently neutralizing the reaction product with a basic reagent containing an alkali metal constituent.

10. The method as described in claim 9 in which the alkali metal is potassium.

11. The method as described in claim 9 in which the alkali metal is sodium.

12. The method of inhibiting the formation of deposits of the type of sludge, carbon and varnish in an internal combustion engine during use comprising lubricating said engine with a lubricating oil, a small amount of the reaction product of a phosphorus sulfide and a hydrocarbon, and a small amount of a neutralized phosphorus and sulfur-containing phosphorus sulfide-hydrocarbon reaction product obtained by reacting a phosphorus sulfide with a hydrocarbon and subsequently neutralizing the reaction product with a basic reagent.

13. The method as described in claim 12 in which the hydrocarbon is a petroleum oil and the phosphorus sulfide is phosphorus pentasulfide.

14. The method of inhibiting the formation of deposits of the type of sludge, carbon and varnish in an internal combustion engine during use comprising lubricating said engine with a lubricant comprising a lubricating oil, from about 0.001% to about 10.0% of the phosphorus and sulfur-containing phosphorus sulfide-hydrocarbon reaction product, and from about 0.001% to about 10.0% of a neutralized phosphorus and sulfur-containing phosphorus sulfide-hydrocarbon reaction product obtained by reacting a phosphorus sulfide with a hydrocarbon and subsequently neutralizing the reaction product with a basic reagent containing a metal constituent.

15. The method as described in claim 14 in which the phosphorus sulfide is phosphorus pentasulfide, and the neutralized reaction product contains potassium.

16. The method as described in claim 14 in which the phosphorus sulfide is phosphorus pentasulfide, and the neutralized reaction product contains tin.

17. The method of inhibiting the formation of deposits of the type of sludge, carbon and varnish in an internal combustion engine during use comprising lubricating said engine with a lubricant comprising a major proportion of a lubricating oil and from about 0.001% to about 10.0% of a neutralized phosphorus and sulfur containing reaction product of a phosphorus sulfide and a hydrocarbon obtained by reacting a phosphorus sulfide with a hydrocarbon and subsequently neutralizing the reaction product with a basic reagent containing a metal constituent.

18. The method as described in claim 17 in which the phosphorus sulfide is phosphorus pentasulfide and the neutralizd reaction product contains potassium.

19. The method of inhibiting the formation of deposits of the type of sludge, carbon and varnish in an internal combustion engine during use, comprising lubricating said engine with a lubricant comprising a lubricating oil normally susceptible to form sludge, carbon and varnish in an internal combustion engine during use and a small amount of a metal-containing neutralized phosphorus and sulfur-containing reaction product of phosphorus pentasulfide and a hydrocarbon obtained by reacting phosphorus pentasulfide with a hydrocarbon and subsequently neutralizing the reaction product with a basic reagent containing a metal constituent.

20. A lubricant comprising a lubricating oil and a small amount of a metal-containing neutralized phosphorus and sulfur-containing reaction product of a phosphorus sulfide and an aliphatic hydrocarbon obtained by reacting a phosphorus sulfide with an aliphatic hydrocarbon and subsequently neutralizing the reaction product with a basic reagent containing a metal constituent.

21. A lubricant as described in claim 20, in which the metal is an alkali metal.

22. A lubricant as described in claim 20 in which the metal is potassium.

23. A lubricant as described in claim 20 in which the metal is sodium.

24. A lubricant as described in claim 20 in which the metal is tin.

25. A new composition of matter comprising a hydrocarbon oil and a neutralized phosphorus and sulfur-containing reaction product of a phosphorus sulfide and a hydrocarbon obtained by reacting a phosphorus sulfide with a hydrocarbon and subsequently neutralizing the reaction product with a basic reagent.

26. A new composition of matter as described in claim 25 in which the hydrocarbon is an aliphatic hydrocarbon.

27. A new composition of matter comprising a hydrocarbon oil and a metal-containnig neutralized phosphorus and sulfur-containing reaction product of a phosphorus sulfide and a hydrocarbon obtained by reacting a phosphorus sulfide with a hydrocarbon and subsequently neutralizing the reaction product with a basic reagent containing a metal constituent.

28. A lubricant as described in claim 27 in which the metal is an alkali metal.

29. A new composition of matter as described in claim 27 in which the metal is potassium.

30. A new composition of matter as described in claim 27 in which the metal is sodium.

31. A new composition of matter as described in claim 27 in which the metal is tin.

CLARENCE M. LOANE.
JAMES W. GAYNOR.